United States Patent [19]

Leppek

[11] Patent Number: 4,637,534
[45] Date of Patent: Jan. 20, 1987

[54] ANTITHEFT BICYCLE HANDLEBAR BAG

[75] Inventor: William W. Leppek, Lima, Ohio

[73] Assignee: The Mead Corporation, Dayton, Ohio

[21] Appl. No.: 846,187

[22] Filed: Mar. 31, 1986

[51] Int. Cl.⁴ .............................................. B62J 7/00
[52] U.S. Cl. ........................................ 224/36; 224/31
[58] Field of Search .................. 383/7, 9; 150/52 R; 74/551.8; 224/30 R, 31, 30 A, 32 R, 33 A, 34, 35, 36; 280/289 R, 289 A

[56] References Cited

U.S. PATENT DOCUMENTS

| | | | |
|---|---|---|---|
| 2,011,016 | 8/1935 | Schwinn | 224/31 |
| 2,424,195 | 7/1947 | Schwinn | 224/36 |
| 3,955,729 | 5/1976 | Montgomery | 224/36 |
| 4,056,219 | 11/1977 | Hine, Jr. | 224/36 |
| 4,066,196 | 1/1978 | Jackson et al. | 224/36 |

Primary Examiner—Stephen Marcus
Assistant Examiner—David Voorhees
Attorney, Agent, or Firm—Biebel, French & Nauman

[57] ABSTRACT

An antitheft bag for mounting on the handlebars of a bicycle which includes opposing front and rear portions, a pair of opposing side portions, an upper closure flap for closing bag about a handlebar crossbar, and a bottom portion having a hole shaped to receive a handlebar stem therethrough. The bag slides over the handlebars and is continuous about the periphery of the hole so that, when mounted on the handlebars, it cannot be removed without separating the stem tube from the head tube. The closure member preferably includes padding which is positioned to be superposed to the crossbar to provide additional cushioning, and the rear portion preferably includes a zippered opening for access into the interior of the bag without disturbing the flap.

11 Claims, 9 Drawing Figures

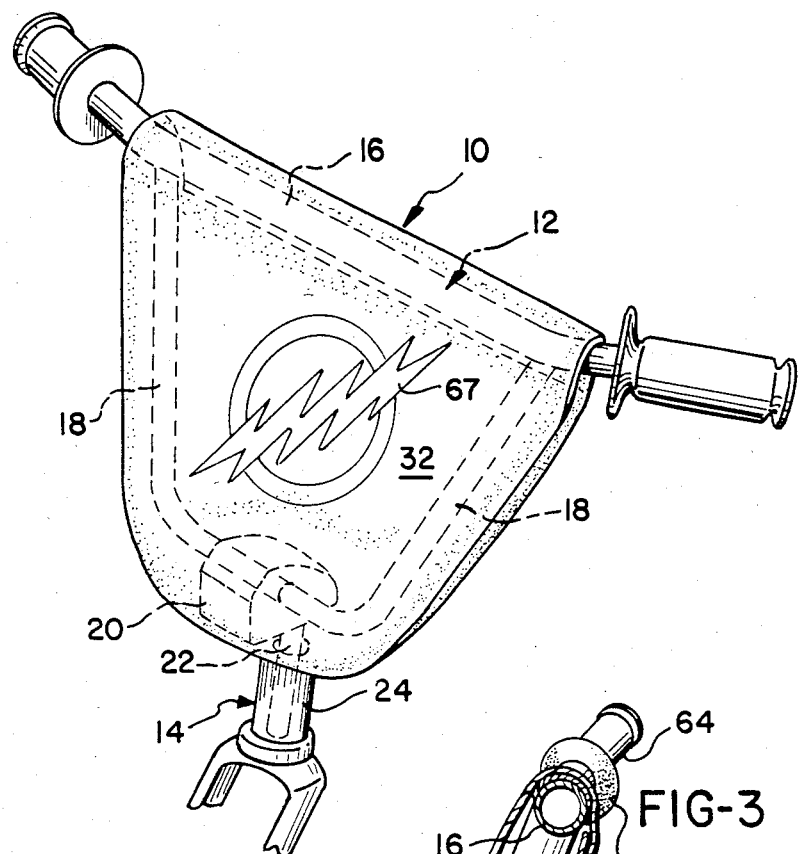
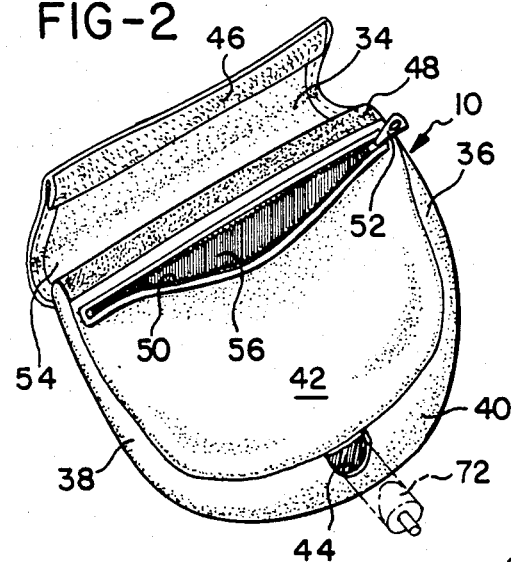
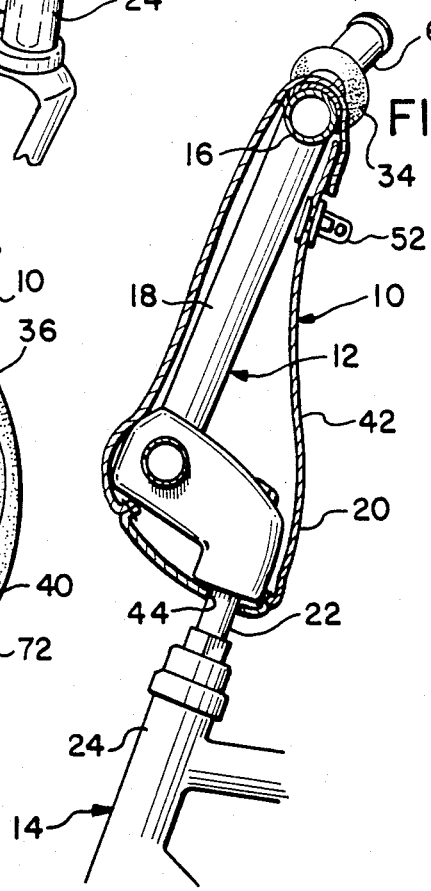

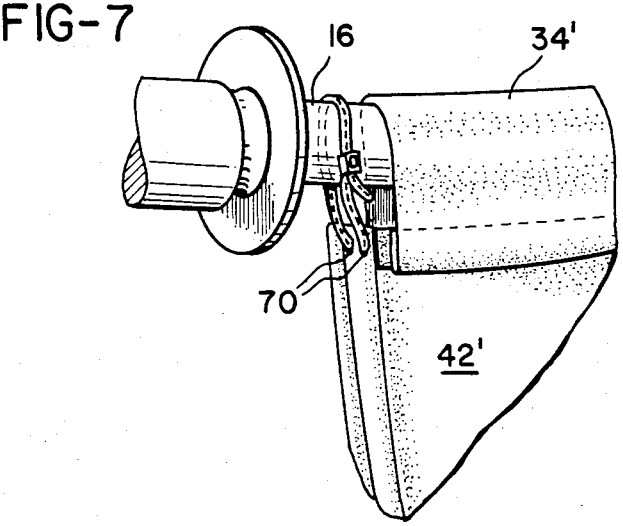
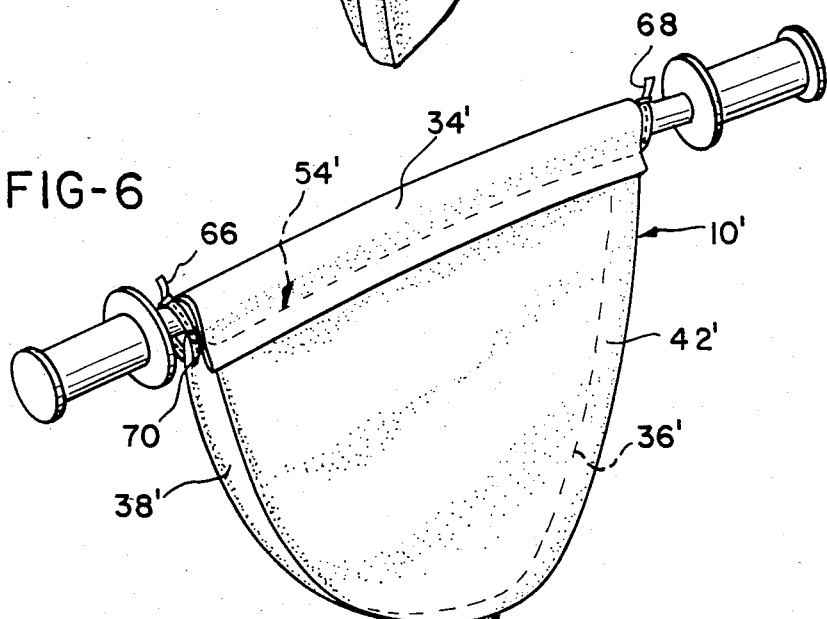
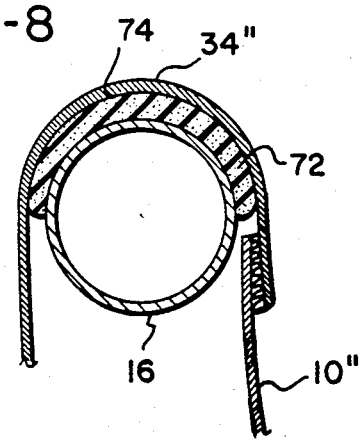
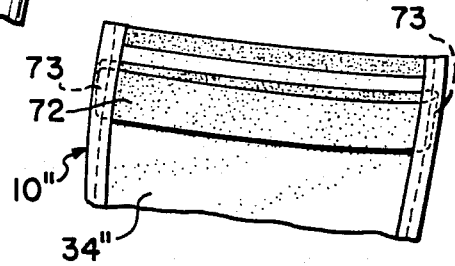

ANTITHEFT BICYCLE HANDLEBAR BAG

BACKGROUND OF THE INVENTION

The present invention relates to bicycle carrier bags and, more particularly, to bags adapted to be mounted on the handlebars of a bicycle or similar vehicle.

It is often desirable to equip a bicycle with a storage bag or compartment to hold tools, rain gear, refreshments and the like. In order not to add significantly to the weight of a bicycle, many bags are made of a lightweight fabric material. Such bags typically are mounted on the handlebars of a bicycle, since this location is easily accessible to a rider while seated on the bicycle and does not obstruct a rider's legs while pedaling the bicycle.

An example of such a flexible, fabric carrier bag is disclosed in Hine, Jr., et al. U.S. Pat. No. 4,260,086. That patent discloses a carrier bag which is supported on a bent wire frame and includes a loop shaped to fit about the stem and crossbar of maes bend handlebars. The bag includes straps which depend downwardly and terminate in hooks adapted to engage the fender strut holes located at the bottom of the front fork.

One disadvantage with such a carrier bag is that, while rather easy to attach to a bicycle, it is also easily removed, a feature which would encourage the casual theft of the carrier bag. Another disadvantage with that type of bag structure is that it is not readily adaptable to different styles of bicycle handlebars, such as, for example, BMX-style handlebars which include a crossbar extending between a pair of upright members for added rigidity.

Accordingly, there is a need for a bicycle bag made of a flexible fabric material which can be mounted on the handlebars of a bicycle in a manner which is a deterrent to the casual theft of the bag. Furthermore, there is a need for a handlebar bag which can be mounted on BMX-style handlebars.

SUMMARY OF THE INVENTION

The present invention is an antitheft bicycle handlebar bag which is specially designed to be mounted on BMX-style handlebars. The handlebar bag includes opposing front and rear portions, a pair of opposing side portions extending between the front and rear portions, an upper closure flap extending between the front and rear portions for closing the bag, and a bottom portion extending between the front, rear and side portions and having a hole shaped to receive a handlebar stem therethrough. The bag is shaped to receive the handlebars in its interior and is continuous about the periphery by inserting the handlebar stem through the hole and into the head tube.

Accordingly, in order to remove the bag from the bicycle without destroying the bag, it is necessary first to separate the handlebar stem from the fork stem of the bicycle frame, a procedure which requires the use of a wrench or similar tool and is relatively time-consuming. Both factors deter the causal theft of the bag.

In a preferred embodiment of the invention, the side and bottom portions of the bag are made of a unitary, continuous fabric panel which is bent to form a substantially U-shape. The closure flap comprises a continuation of the front portion and preferably includes a strip of hook and loop fasteners material extending across its edge. The rear panel also includes a strip of hook and loop material positioned to engage the corresponding strip on the flap when the flap is folded over the crossbar.

The flap encloses the crossbar when closed and thereby obviates the need for the standard crossbar padding which is used with BMX-style handlebars. Furthermore, when used with BMX-style handlebars, the bag of the present invention completely encloses the stem top and therefore obviates the need for additional padding in that area. In one embodiment of the invention, the bag includes a strip of foam rubber attached to the inner surface of the closure flap and positioned to extend transversely of the flap so that it lies over the crossbar when the flap is closed. This foam rubber pad provides additional cushioning of the crossbar.

Also in the preferred embodiment, the bag includes a transverse slit extending along the rear portion beneath the edge of the flap. The slit includes a zipper so that it may be opened or closed to allow access to the interior of the bag while the flap remains closed.

In another embodiment, the bag can be formed without the zippered slit, so that access to the interior of the bag is achieved by opening the closure flap. With this embodiment, it is desirable to attach the upper corners of the bag to the bicycle crossbar by cable ties, or other flexible fasteners such as string so that the bag will not sag downwardly away from the crossbar when the upper flap is opened. Furthermore, to remove this embodiment from the bicycle, a second tool is required to cut the ties or fasteners, so that the fasteners act as an additional deterent to casual theft of the bag.

A benefit inherent in all of the foregoing embodiments of the invention is that the bag provides a large frontal graphic display surface, thereby eliminating the need for placards or other, additional surfaces for displaying indicia to attract potential purchasers.

Accordingly, it is an object of the present invention to provide a handlebar bag which is designed to be attached to the handlebars of a BMX-style bicycle in a fashion that prevents the casual theft of the bag; a handlebar bag which eliminates the need for separate padding of the handlebar crossbar and stem top; and a handlebar bag which inherently provides a large frontal graphic display area.

Other objects and advantages of the present invention will be apparent from the following description, the accompanying drawings, and the appended claims.

BRIEF DESCRIPTION OF THE DRAWINGS

FIG. 1 is a front perspective view of a preferred embodiment of the handlebar bag of the present invention, shown mounted on bicycle handlebars;

FIG. 2 is a rear perspective view of the handlebar bag of FIG. 1, with a handlebar stem shown in phantom;

FIG. 3 is a side elevation in section of the handlebar bag of FIG. 1, shown mounted on bicycle handlebars;

FIG. 6 is a rear perspective view of an alternate embodiment of the handlebar bag of the present invention, mounted on bicycle handlebars;

FIG. 7 is a detail of the handlebar bag of FIG. 6;

FIG. 8 is a detail side elevation in section of another alternate embodiment of the handlebar bag of the present invention; and FIG. 9 is a detail of the flap of the embodiment of claim 8.

DETAILED DESCRIPTION OF THE PREFERRED EMBODIMENTS

Figure 4:
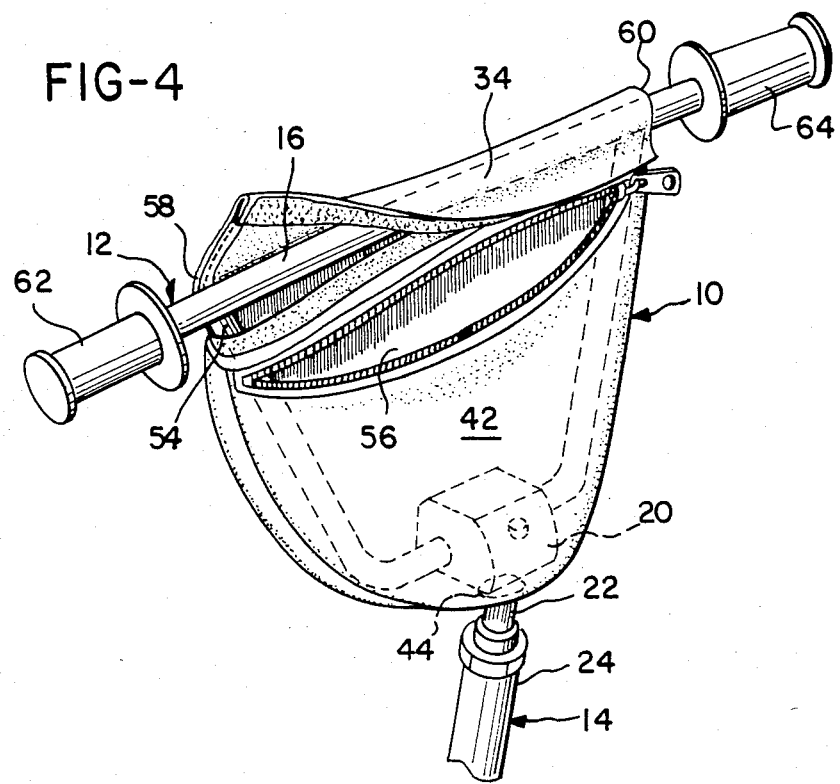
FIG. 4 is a rear perspective view of the handlebar bag of FIG. 1, shown mounted on handlebars with the closure flap partially open and the zippered slit open.

As shown in FIGS. 1, 2 and 3, the handlebar bag of the present invention, generally designated 10, is designed to be mounted on the handlebars 12 of a conventional bicycle 14. The bag 10 is specially adapted to be used with BMX-style handlebars 12 shown, which include a crossbar 16, downwardly extending bars 18, an enlarged stem top 20, and a stem tube 22 which extends downwardly from the stem top and is retained within the bicycle head tube 24.

Figure 5:
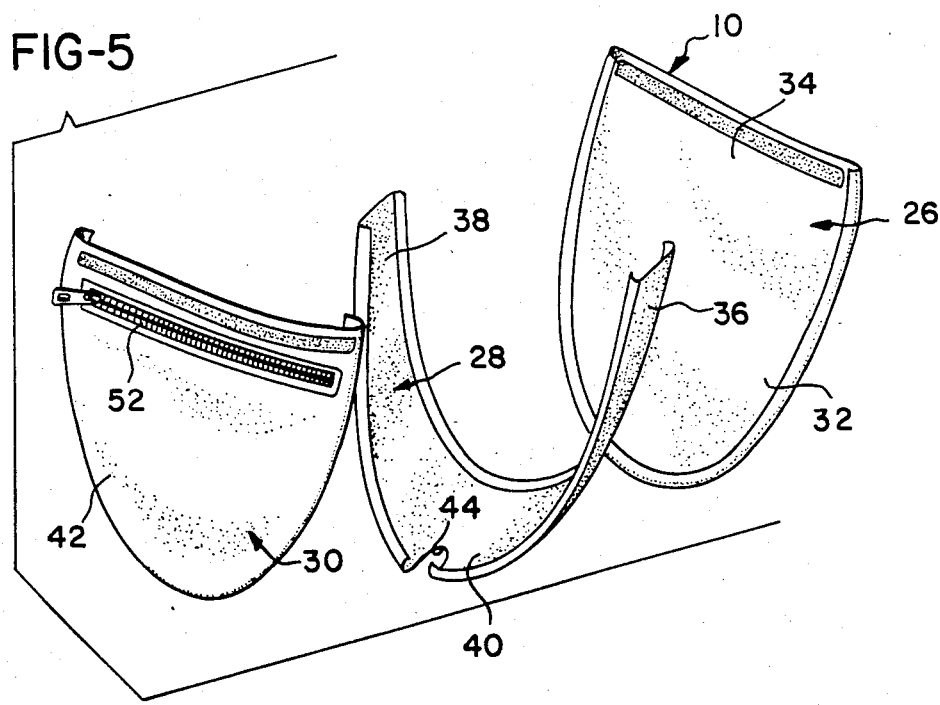
FIG. 5 is an exploded, perspective view of the handlebar bag of FIG. 1.

As shown in FIG. 5, the bag 10 includes a front panel 26, a side panel 28, and a rear panel 30. The panels 26, 28, 30 are made of a flexible fabric such as nylon or cotton duck. The panels 26, 28, 30 are sewn together at their peripheries so that the front panel 26 forms a front portion 32 and a closure flap 34, side panel 28 forms a pair of opposing side portions 36, 38 joined by a bottom portion 40, and rear panel 30 forms a rear portion 42 of the bag 10. The bottom portion 40 includes a hole 44. The fabric material of the bag 10 is continuous about the hole 44, and the hole is shaped to receive the stem tube 22 therethrough.

The closure flap 34 includes a strip 46 of hook and loop fastener material extending across its edge which is positioned to engage a corresponding strip 48 of hook and loop material extending transversely across the top of the rear portion 42 when the flap is folded over as shown in FIG. 3. The rear portion 42 also includes a slit 50 having a zipper 52 which extends transversely of the rear portion adjacent to the strip 48. Thus, the bag 10 includes an upper opening 54, which is opened and closed by the flap 34, and a lower opening 56, which is opened and closed by the zipper 52.

As best shown in FIGS. 3 and 4, the bag 10 is mounted on a bicycle 14 by inserting the handlebars through the upper opening 54 until the stem tube 22 protrudes outwardly through the hole 44. The stem tube 44 is then attached to the head tube 24 in the appropriate manner for the particular bicycle 14, and the closure flap closed about the crossbar 16 and sealed by joining the strips 46 and 48 of hook and loop material. The closure flap 34 is sized such that gaps 58, 60 are formed at the sides of the bag which allow the ends 62, 64 of the crossbar to extend outwardly from the sides of the bag.

When mounted in this fashion on the handlebars 12, the closure flap 34 lies over and encloses the crossbar 16, thereby providing a measure of padding for the crossbar. At the lower end of the bag, the rear portion 42 encloses the stem top 20 and also provides a measure of padding. In the preferred embodiment, the bag 10 is dimensioned such that the rear portion 42 is held with sufficient tension between the stem 22 and crossbar 16 so that it cannot be deflected inwardly against the stem top 20. Thus, the slight tension exerted on the rear portion, coupled with the inherent resiliency of the fabric material comprising the rear portion, provide an additional measure of padding and protection to the stem top.

It is also apparent from inspection of FIGS. 1, 3, and 4 that the bag 10 cannot be removed from the bicycle 14 without separating the handlebars 12 from the head tube 24. Thus, the bag design deters the casual theft of the bag by its removal from the bicycle 14.

As shown in FIG. 1, the front portion 32 presents a large frontal display area for graphics such as the symbol 67. This large frontal area provides the bag with an inherent marketing feature, since the types of bicycles on which the bag is mounted typically are displayed in parallel in rows, with the front portions of the bicycles facing the customer.

FIGS. 6 and 7 show an alternate embodiment of the invention. With this embodiment, a bag 10' includes a rear portion 42' which lacks the zippered slit 50 (see FIG. 2). Consequently, access to the interior of the bag 10' is through the upper opening 54' which is opened and closed by movement of the closure flap 34'.

In order to prevent the bag 10 from sagging downwardly when the closure flap 34 is open, cable ties 66, 68 are provided at the sides of the bag and extend through holes 70 formed in the side portions 36', 38' (only hole 70 for side portion 38' is shown in FIGS. 6 and 7).

FIGS. 8 and 9 show another embodiment of the invention in which a bag 10" includes a closure flap 34" having a strip of foam rubber 72 whose ends are stitched into the side seams 73 so that the strip lies flat against the interior surface 74 and extends substantially the length of the flap 34". The foam strip 72 provides an additional measure of padding for the crossbar 16.

While the forms of appratus herein described constitute preferred embodiments of this invention, it is to be understood that this invention is not limited to these precise forms of apparatus, and that changes may be made therein without departing from the scope of the invention.

What is claimed is:

1. An antitheft bag for mounting on the handlebars of a bicycle, comprising:
   opposing front and rear portions;
   a pair of opposing side positions extending between said front and rear portions;
   upper closure means extending between said front and rear portions for closing said bag about a handlebar crossbar; and
   a bottom portion extending between said front, rear, and side portions and having a hole shaped to receive a handlebar stem therethrough, said bag being continuous about a periphery of said hole, whereby said bag is attachable to a bicycle between an associated handlebar stem and bicycle head tube, and cannot be removed therefrom without separation of a handlebar stem thereof from an associated head tube.

2. The bag of claim 1 wherein said front, rear, side, and bottom portions, and said closure means, are made of a flexible fabric.

3. The bag of claim 1 wherein said closure means is superposed to said side portions to form gaps therewith shaped to receive handlebar ends therethrough.

4. The bag of claim 1 wherein said closure means includes cushion means shaped to be superposed to a crossbar of an associated handlebar for providing padding for said crossbar.

5. The bag of claim 1 wherein said closure means is integral with said front portion.

6. The bag of claim 1 further comprising means for positively connecting said rear portion to an associated handlebar.

7. The bag of claim 6 wherein said connecting means includes a cable tie and said rear portion includes an opening shaped to receive said cable tie therethrough such that said cable tie may be looped about a handlebar crossbar.

8. The bag of claim 1 wherein said side and bottom portions comprise a unitary, continuous fabric panel having substantially a U-shape.

9. The bag of claim 1 wherein said front panel and upper closure means comprise a distinct fabric member attached about at its periphery to said side and bottom portions.

10. The bag of claim 1 wherein said rear portion includes an elongate slit therethrough positioned adjacent to said upper closure means, and zipper means for selectively opening and closing said slit, thereby providing access to an interior of said bag.

11. An antitheft bag for mounting on the handlebars of a bicycle, comprising:

a unitary, continuous fabric panel having a substantially U-shape and including opposing side portions and a bottom portion extending therebetween, said bottom portion having a hole shaped to receive a handlebar stem therethrough;

opposing front and rear portions, each being made of a fabric material and attached about its periphery to said fabric panel;

said front portion including upper closure means extending to said rear portion and being superposed to said side portions to form gaps therewith shaped to receive handlebar ends therethrough, said closure means including a cushion on an underside thereof positioned to be superposed to a crossbar of an associated bicycle, and means for fastening said closure means to said rear portion;

said rear portion including a cable tie for securing said bag to an associated handlebar; and said fabric of said bag being continuous about a periphery of said hole whereby said bag is attachable to a bicycle between an associated handlebar stem and bicycle head tube, and cannot be removed therefrom without separation of a handlebar stem thereof from an associated head tube.

* * * * *

UNITED STATES PATENT AND TRADEMARK OFFICE
CERTIFICATE OF CORRECTION

PATENT NO. : 4,637,534

DATED : January 20, 1987

INVENTOR(S) : William W. Leppek

It is certified that error appears in the above-identified patent and that said Letters Patent is hereby corrected as shown below:

Page 1, Assignee "The Mead Corporation" should read
--Huffy Corporation--.

Signed and Sealed this

Twenty-seventh Day of October, 1987

Attest:

DONALD J. QUIGG

*Attesting Officer*  *Commissioner of Patents and Trademarks*